United States Patent Office.

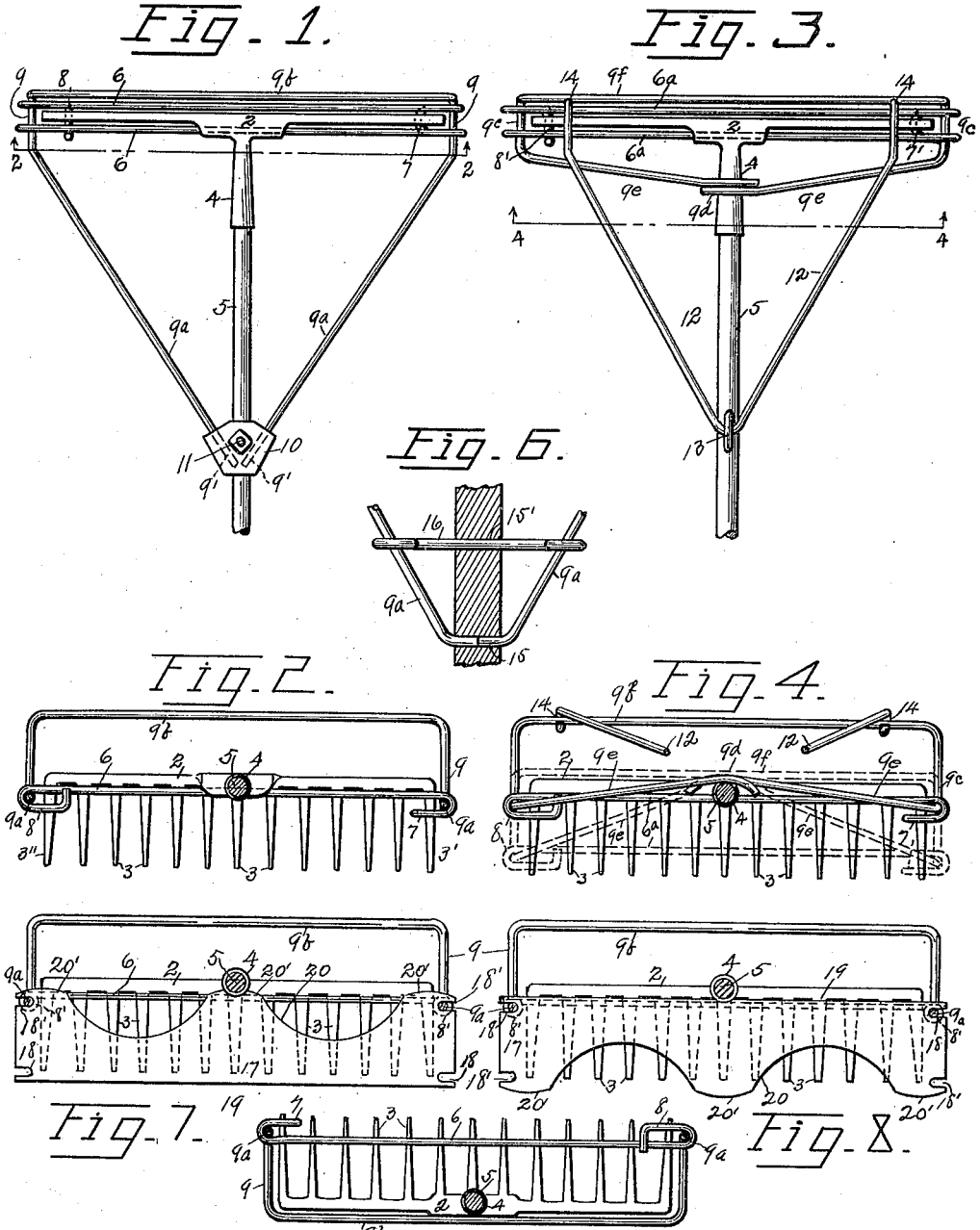

NORMAN J. HOAG, OF SKANEATELES, NEW YORK.

COMBINED TOOL.

1,318,079.  Specification of Letters Patent.  Patented Oct. 7, 1919.

Application filed February 5, 1919. Serial No. 275,214.

*To all whom it may concern:*

Be it known that I, NORMAN J. HOAG, a citizen of the United States, residing at Skaneateles, in the county of Onondaga and State of New York, have invented certain new and useful Improvements in Combined Tools, of which the following is a specification.

This invention relates to improvements in combination tools, designed for use in connection with gardens, lawns and the like, and has for its object to provide in combination with a common garden rake, a novel and simple attachment for cleaning or removing the grass, weeds, leaves, &c., from the teeth of the rake. A further object is to provide novel and simple means combined and coöperating with the rake and the cleaning parts, for creating furrows or gutters to receive garden and other seeds, and which is reversible, for providing effective means for filling the said furrows, and properly covering up the seeds, as well as performing the usual functions of a scraper.

I attain these objects by the means set forth in the detailed description which follows, and as illustrated by the accompanying drawing, in which—

Figure 1 is a top view of the rake having the cleaning attachment applied thereto in the released position. Fig. 2 is a sectional view, taken on line 2—2 of Fig. 1. Fig. 3 is a top view showing a modification of the cleaning attachment. Fig. 4 is a sectional view taken on line 4—4 of Fig. 3, showing by full and dotted lines the released and operated positions of the cleaning parts. Fig. 5 is a view showing the rake inverted and the tooth-stripping member positioned near the points of the teeth, the same being the fully operated position. Fig. 6 is a detail view showing a modification of the means for connecting parts of the cleaning device to the handle of the rake. Fig. 7 is an inner-side elevation of the tool shown in Fig. 2; showing the scraping device in the operative position. Fig. 8 is a similar view showing the device reversed for providing the furrowing means. Fig. 9 is a detached view of the furrow-marker and scraper.

In the drawing, 2 represents the head or body of the rake, 3 the teeth, and 4 is a centrally located socket which receives the handle 5, the socket 4 preferably being cast or forged with the body in the usual manner.

Referring to Figs. 1, 2, 5, 7 and 8, the self-cleaning attachment consists of the following parts: 6 is a wire which is folded and bent into the form of a relatively long loop or link, the sides of which are parallel and are spaced apart sufficiently to receive all of the teeth 3 of the rake, the said link having at one end a downwardly and inwardly bent hook 7, which receives the adjacent end-tooth 3′, the opposite end of said link being bent in similar fashion to provide a similar hook 8, which receives the adjacent end-tooth 3″. The hook 8, however, comprises the two ends of the wire 6, and one end is bent laterally and thence upwardly and engages the opposite side part of the link, for preventing the accidental spreading of the ends of the wire. The stripping or cleaning link 6 is normally held in the idle or released position (see Figs. 2 and 7) close to the back of the head 2, by a wire 9, whose free ends 9′ are rigidly secured to the handle 5 by a clamp 10 and a bolt 11, the latter piercing both the clamp and the handle. The arms 9ª of the wire 9 are springs, which extend at angles toward the opposite ends of the head 2 and pass through the hooks 7 and 8 of the link 6 just outside of the end teeth 3′ and 3″. After passing through said hooks, the wire 9 is bent upwardly and thence extends laterally a distance slightly greater than the length of the head 2, for forming an upwardly projecting right angle compression loop 9ᵇ. The tension of the spring-arms 9ª normally and resiliently hold the loop 9ᵇ above the head 2 (as best seen in Fig. 2), during the raking operations. When rakes are employed for raking lawns, the grass and leaves usually cling to and clog up the teeth and require frequent cleaning and removal. To remove the grass and leaves from my improved rake, the operator simply turns the rake bottom side upward, as shown in Fig. 5, and then strikes the loop 9ᵇ against the ground with sufficient force to overcome the springs 9ª. This operation forces the link or stripper 6 upwardly on both sides of the teeth 3 and removes the accumulation of grass and leaves. Upon relieving the pressure on the loop 9ᵇ, the springs 9ª instantly restore the parts 6 and 9ᵇ to the position shown in Figs. 1, 2 and 7, ready for the next raking and cleaning operation.

Figs. 3 and 4 illustrate a modification of the cleaning attachment, which consists of a stripping part 6ª, which is of similar construction as the part 6, and is applied in the same manner. 9° represents a wire, the free ends of which are slightly bent, as at 9ᵈ, and these ends rest upon the socket 4. Arms 9ᵉ extend in opposite directions from the handle toward the opposite ends of the head of the rake and then they are bent horizontally passing through the hooks 7' and 8' of the part 6ª. The wire 9ᶜ is then bent upwardly and extends laterally parallel to the head of the rake and to the loop 6ª, for forming a loop 9ᶠ, corresponding to the loop 9ᵇ. The loop 9ᶠ is steadied and held in the upright position by a brace, which consists of a wire 12, which is bent in the form of a V, the point of the V preferably being secured to the handle by a staple 13, while the ends of wire 12 are bent into hooks or eyes 14, which engage the loop 9ᶠ, as shown in Figs. 3 and 4. The dotted lines in Fig. 4 show that by forcing the loop 9ᶠ toward the head 2 correspondingly moves the stripper 6ª along the teeth toward their points for removing grass or leaves, as described.

Fig. 6 shows a modified means for securing the spring arms 9ª to the handle, which consists of inserting the ends of the arms into a hole 15 bored transversely through the handle 5, and then inserting a wire 16 through a perforation 15' in the handle, after which the ends of the wire 16 are folded or bent around the opposite arms 9ª. The wire 16 tends to normally hold the arms 9ª and the loop 9ᵇ in the same position as shown in Figs. 1 and 2, but allows the arms to flex whenever force is applied to the loop 9ᵇ, for cleaning the teeth, as described.

Figs. 7, 8 and 9 illustrate the furrowing and scraping attachment of the combined tool, which consists of a sheet metal part 17, which is provided at each end with similar notches 18 and 18', for engaging the arms 9ª or 9ᵉ. Fig. 8 shows the part 17 applied to the rake by engaging the notches 18 with the arms 9ª. This positions the straight or scraping edge 19 close and parallel to the back of the head 2, while the opposite corrugated edge 20 extends a short space below the points of the teeth 3. The rounded points 20' of the edge 20 are preferably spaced equidistantly, and these are employed for forming furrows or shallow gutters in which various seeds may be sown. The plate 17 when in operative position preferably lies against the inner faces of the teeth, which tends to hold said plate vertically and more or less rigid while the tool is being drawn over the earth in the direction indicated by the handle 5. After the seeds have been deposited in the furrows (not shown) formed by the points 20' of the plate 17, the plate 17 should be removed and inverted and again applied to the rake, as shown in Fig. 7, wherein the notches 18' engage the arms 9ª. This reversal of the plate brings the straight edge 19 slightly below the points of the teeth, and converts the implement into a scraper, which when drawn over the portion of the earth that has been furrowed, will scrape the displaced loose earth back into and fill up the furrows. The plate 17 while in the last described position, may also be employed for any other kind of scraping or leveling work. When the tool is employed for the ordinary work of raking lawns or gardens, the furrowing and scraping part 17 is generally detached and laid aside. So also, when the rake proper is used for raking cultivated earth, such as a garden, the wire parts comprising the cleaning attachment may be readily and quickly detached and temporarily laid aside.

My combined tool is very simple and useful, and can be produced at small expense. By combining the parts as herein shown the planting and cultivating of gardens, as well as the care of lawns may be accomplished by but one tool.

Having thus described my invention, what I claim is—

1. The combination of a rake including a handle, a cleaning device supported by the rake, said cleaning device provided with converging spring-arms connected to the handle, and a sheet metal plate having a scraping and a corrugated edge, and having corresponding notches to receive said spring-arms for holding said blade against the rake.

2. A combined tool, comprising a rake having a number of teeth and a handle, an elongated stripping link surrounding the teeth and having similar end loop-hooks encircling the opposite end teeth, a triangle-shaped wire having spring-arms which pass through said loop-hooks outside of the end teeth adapted to resiliently hold said stripping link adjacent the head of the rake, one side of said triangle comprising a transverse right angle loop projecting above the head of the rake adapted when subjected to pressure to move said link toward the points of the teeth, and means for rigidly clamping the free ends of said spring-arms to said handle.

3. A combined tool comprising a rake and a handle, a cleaning device supported by said rake and having spring arms disposed at the opposite ends of the rake and extending toward the handle, and a furrow-marker comprising an oblong plate having notches at its opposite ends to engage said spring arms adjacent said rake.

4. The combination of a rake having a head and a plurality of depending teeth and a handle arranged at right angles to the head, a self-cleaning device comprising a wire having an upwardly projecting compression loop disposed parallel to and normally positioned above the head of the rake, and having rearwardly converging spring arms rigidly supported by the handle, and an elongated stripping link surrounding the teeth and having downwardly and inwardly bent loop-hooks which encircle the corresponding end teeth beneath the head, said loop-hooks projecting beyond the end-teeth sufficiently to receive said spring arms.

In testimony whereof I affix my signature.

NORMAN J. HOAG.

Copies of this patent may be obtained for five cents each, by addressing the "Commissioner of Patents, Washington, D. C."